(12) United States Patent
Kang et al.

(10) Patent No.: US 10,087,340 B2
(45) Date of Patent: *Oct. 2, 2018

(54) HARD COATING FILM

(71) Applicant: LG CHEM, LTD., Seoul (KR)

(72) Inventors: Joon Koo Kang, Daejeon (KR); Soon Hwa Jung, Daejeon (KR); Yeong Rae Chang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 579 days.

This patent is subject to a terminal disclaimer.

(21) Appl. No.: 14/420,867

(22) PCT Filed: Jul. 29, 2013

(86) PCT No.: PCT/KR2013/006781

§ 371 (c)(1),
(2) Date: Feb. 10, 2015

(87) PCT Pub. No.: WO2014/030851

PCT Pub. Date: Feb. 27, 2014

(65) Prior Publication Data

US 2015/0197662 A1  Jul. 16, 2015

(30) Foreign Application Priority Data

Aug. 23, 2012  (KR) .................. 10-2012-0092529
Aug. 23, 2012  (KR) .................. 10-2012-0092532
Aug. 23, 2012  (KR) .................. 10-2012-0092533
Jul. 26, 2013  (KR) .................. 10-2013-0089108

(51) Int. Cl.
| *C09D 133/14* | (2006.01) |
| *C08J 5/18* | (2006.01) |
| *C08J 7/04* | (2006.01) |
| *C09D 133/04* | (2006.01) |
| *C08L 51/08* | (2006.01) |
| *C09D 135/02* | (2006.01) |
| *C09D 143/04* | (2006.01) |
| *C09D 4/06* | (2006.01) |
| *C09D 105/16* | (2006.01) |
| *C08K 3/00* | (2018.01) |
| *C08L 33/04* | (2006.01) |
| *C08K 3/36* | (2006.01) |

(52) U.S. Cl.
CPC .............. *C09D 133/14* (2013.01); *C08J 5/18* (2013.01); *C08J 7/04* (2013.01); *C08J 7/047* (2013.01); *C08K 3/00* (2013.01); *C08L 33/04* (2013.01); *C08L 51/08* (2013.01); *C09D 4/06* (2013.01); *C09D 105/16* (2013.01); *C09D 133/04* (2013.01); *C09D 135/02* (2013.01); *C09D 143/04* (2013.01); *C08J 2351/08* (2013.01); *C08K 3/36* (2013.01); *C08K 2201/011* (2013.01); *Y10T 428/24917* (2015.01); *Y10T 428/24942* (2015.01)

(58) Field of Classification Search
CPC ... C08J 2351/08; C08J 5/18; C08J 7/04; C08J 7/047; C08K 2201/011; C08K 3/00; C08K 3/36; C08L 33/04; C08L 51/08; C09D 105/16; C09D 133/04; C09D 133/14; C09D 135/02; C09D 143/04; C09D 4/06; Y10T 428/24917; Y10T 428/24942

See application file for complete search history.

(56) References Cited

U.S. PATENT DOCUMENTS

| 5,146,531 A | 9/1992 | Shustack |
| 6,489,015 B1 | 12/2002 | Tsuchiya et al. |
| 2004/0081831 A1 | 4/2004 | Shoshi et al. |
| 2005/0136273 A1 | 6/2005 | Hashimoto et al. |
| 2007/0134463 A1 | 6/2007 | Sinha et al. |
| 2007/0178297 A1 | 8/2007 | Takada et al. |
| 2007/0237966 A1 | 10/2007 | Takao et al. |
| 2008/0145673 A1 | 6/2008 | Bonnard |
| 2008/0193722 A1 | 8/2008 | Tanaka |
| 2008/0311351 A1 | 12/2008 | Hsu et al. |
| 2009/0169896 A1 | 7/2009 | Sohn et al. |
| 2009/0202819 A1 | 8/2009 | Asahi et al. |
| 2009/0214871 A1 | 8/2009 | Fukuda et al. |
| 2010/0055377 A1 | 3/2010 | Esaki et al. |
| 2010/0084037 A1 | 4/2010 | Ericsson et al. |
| 2011/0050623 A1 | 3/2011 | Lee et al. |
| 2011/0077334 A1 | 3/2011 | Oi et al. |
| 2011/0124823 A1 | 5/2011 | Hayashi et al. |
| 2012/0019766 A1 | 1/2012 | Oki et al. |

FOREIGN PATENT DOCUMENTS

| CN | 1286640 C | 11/2004 |
| CN | 102257087 A | 11/2011 |
| EP | 2397527 A1 | 12/2011 |
| EP | 2 840 107 A1 | 2/2015 |
| EP | 2 840 109 A1 | 2/2015 |
| EP | 2 840 110 A1 | 2/2015 |
| EP | 2 842 989 A1 | 3/2015 |
| EP | 2 843 008 A1 | 3/2015 |
| EP | 2857440 A1 | 4/2015 |
| JP | 2000015734 A | 1/2000 |
| JP | 2000-071392 A | 3/2000 |

(Continued)

OTHER PUBLICATIONS

Communication from European Patent Office in corresponding application EP 13797819.3 dated Dec. 17, 2015, 12 pages.

(Continued)

*Primary Examiner* — Amber R Orlando
*Assistant Examiner* — Lawrence Ferguson
(74) *Attorney, Agent, or Firm* — Rothwell, Figg, Ernst & Manbeck, P.C.

(57) ABSTRACT

The present invention relates to a hard coating film, and, more particularly, to a hard coating film having hardness and excellent physical properties. According to the present invention, the hard coating film has high physical properties including hardness, fouling resistance, slip resistance, scratch resistance, transparency, durability, light resistance, and light transmittance.

Thus, the hard coating film can find useful applications in various fields thanks to its excellent physical properties.

22 Claims, No Drawings

(56) References Cited

FOREIGN PATENT DOCUMENTS

| | | |
|---|---|---|
| JP | 2000-214791 A | 8/2000 |
| JP | 2001-205179 A | 7/2001 |
| JP | 2001-323087 A | 11/2001 |
| JP | 2002-067238 A | 3/2002 |
| JP | 2002-338720 A | 11/2002 |
| JP | 2005-053094 A | 3/2005 |
| JP | 2005-288787 A | 10/2005 |
| JP | 2006-231845 A | 9/2006 |
| JP | 2006-233167 A | 9/2006 |
| JP | 2008-074112 A | 4/2008 |
| JP | 2008-075092 A | 4/2008 |
| JP | 4069499 B2 | 4/2008 |
| JP | 4075147 B2 | 4/2008 |
| JP | 4872893 B2 | 4/2008 |
| JP | 2008116596 A | 5/2008 |
| JP | 2008-138165 A | 6/2008 |
| JP | 2008129130 A | 6/2008 |
| JP | 2008-150484 A | 7/2008 |
| JP | 2008197662 A | 8/2008 |
| JP | 2008-310286 A | 12/2008 |
| JP | 2009-204725 A | 9/2009 |
| JP | 2009204727 A | 9/2009 |
| JP | 2009-241458 A | 10/2009 |
| JP | 2010-017991 A | 1/2010 |
| JP | 2010-052334 A | 3/2010 |
| JP | 2010-053231 A | 3/2010 |
| JP | 2010121013 A | 6/2010 |
| JP | 2010-173234 A | 8/2010 |
| JP | 2010-284910 A | 12/2010 |
| JP | 2011-031457 A | 2/2011 |
| JP | 2011-031527 A | 2/2011 |
| JP | 2011022456 A | 2/2011 |
| JP | 2011504828 A | 2/2011 |
| JP | 2011-043606 A | 3/2011 |
| JP | 2011-075705 A | 4/2011 |
| JP | 2011-110902 A | 6/2011 |
| JP | 2011-178910 A | 9/2011 |
| JP | 2011-201087 A | 10/2011 |
| JP | 2011-246548 A | 12/2011 |
| JP | 2012-081742 A | 4/2012 |
| JP | 4911474 B2 | 4/2012 |
| JP | 2012066477 A | 4/2012 |
| JP | 2013-095108 A | 5/2013 |
| KR | 10-1999-0072670 A | 9/1999 |
| KR | 10-2000-0021805 A | 4/2000 |
| KR | 10-2000-0021806 A | 4/2000 |
| KR | 10-2004-0037081 A | 4/2004 |
| KR | 10-2004-0097189 A | 11/2004 |
| KR | 10-2006-0009194 A | 1/2006 |
| KR | 1020060072072 A | 6/2006 |
| KR | 100730414 B1 | 6/2007 |
| KR | 10-2008-0005839 A | 1/2008 |
| KR | 10-2008-0055698 A | 6/2008 |
| KR | 10-0852562 B1 | 8/2008 |
| KR | 100852561 B1 | 8/2008 |
| KR | 10-2008-0109658 A | 12/2008 |
| KR | 1020090006131 A | 1/2009 |
| KR | 10-0884079 B1 | 2/2009 |
| KR | 10-2009-0044089 A | 5/2009 |
| KR | 1020090045105 A | 5/2009 |
| KR | 1020090047529 A | 5/2009 |
| KR | 10-2009-0063182 A | 6/2009 |
| KR | 1020090061821 A | 6/2009 |
| KR | 10-2009-0073668 A | 7/2009 |
| KR | 10-0905683 B1 | 7/2009 |
| KR | 10-0926220 B1 | 11/2009 |
| KR | 10-2010-0026014 A | 3/2010 |
| KR | 10-2010-0041992 A | 4/2010 |
| KR | 10-2010-0055160 A | 5/2010 |
| KR | 1020100045997 A | 5/2010 |
| KR | 10-2010-0129512 A | 12/2010 |
| KR | 10-2010-0132786 A | 12/2010 |
| KR | 10-2011-0034324 A | 4/2011 |
| KR | 10-2011-0037622 A | 4/2011 |
| KR | 101028463 B1 | 4/2011 |
| KR | 10-2011-0058743 A | 6/2011 |
| KR | 10-2011-0071480 A | 6/2011 |
| KR | 10-2011-0103885 A | 9/2011 |
| KR | 1020110119704 A | 11/2011 |
| KR | 10-2011-0130142 A | 12/2011 |
| KR | 10-2012-0002366 A | 1/2012 |
| KR | 10-1127952 B1 | 3/2012 |
| KR | 101114932 B1 | 3/2012 |
| KR | 10-2012-0058635 A | 6/2012 |
| KR | 10-1150719 B1 | 6/2012 |
| KR | 10-1168073 B1 | 7/2012 |
| KR | 10-2012-0136597 A | 12/2012 |
| KR | 101295325 B1 | 8/2013 |
| TW | 200907401 A | 2/2009 |
| TW | 201041985 A | 12/2010 |
| TW | 201130880 A | 9/2011 |
| TW | 201202403 A | 1/2012 |
| TW | I357922 B | 2/2012 |
| WO | 2006046855 A1 | 5/2006 |
| WO | 2006-088200 A1 | 8/2006 |
| WO | WO 2008-098872 A1 | 8/2008 |
| WO | 2011/105532 A1 | 9/2011 |
| WO | 2012/026475 A1 | 3/2012 |
| WO | 2012/060145 A1 | 5/2012 |

OTHER PUBLICATIONS

Shin-Nakamura Chemical Industry Co., Ltd., [Sep. 20, 2016]-Product List, Photo curable monomers/oligomers: Urethane acrylates with English translation (2 pages).

Third Party Observation dated Oct. 14, 2016 of the corresponding Japanese Patent Application No. 2015-528383 (9 pages).

"Ciba TINUVIN 900 Light Stabilizer", Ciba Specialty Chemicals, 1997, pp. 1-3.

Written Opinion and Search Report issued in related international application No. PCT/KR2013/006778 dated Oct. 17, 2013 along with English translation, 17 pages.

Written Opinion and Search Report issued in related international application No. PCT/KR2013/006773 dated Oct. 22, 2013 along with English translation, 20 pages.

Written Opinion and Search Report issued in related international application No. PCT/KR2013/006775 dated Oct. 25, 2013 along with English translation, 25 pages.

Written Opinion and Search Report issued in related international application No. PCT/KR2013/006780 dated Nov. 27, 2013 along with English translation, 20 pages.

Written Opinion and Search Report issued in related international application No. PCT/KR2013/006781 dated Nov. 27, 2013 along with English translation, 18 pages.

Written Opinion and Search Report issued in related international application No. PCT/KR2013/006782 dated Nov. 27, 2013 along with English translation, 20 pages.

Extended Search Report dated Jan. 29, 2016 of EP Patent Application No. 13830624.6 (9 pages).

Extended Search Report dated Mar. 15, 2016 of EP Patent Application No. 13830681.6 (10 pages).

Extended Search Report dated Apr. 6, 2016 of EP Patent Application No. 13831101.4 (8 pages).

Extended Search Report dated Apr. 6, 2016 of EP Patent Application No. 13831327.5 (8 pages).

Extended Search Report dated Mar. 11, 2016 of EP Patent Application No. 13830272.4 (7 pages).

Extended Search Report dated Mar. 14, 2016 of EP Patent Application No. 13830709.5 (9 pages).

Extended Search Report dated Apr. 4, 2016 of EP Patent Application No. 13830724.4 (11 pages).

HARD COATING FILM

CROSS REFERENCE TO RELATED APPLICATIONS

This application is a 35 U.S.C. § 371 National Phase Entry Application from PCT/KR2013/006781, filed Jul. 29, 2013, and designating the United States, which claims priority under 35 U.S.C. § 119 to Korean Patent Application No. 10-2012-0092529 filed Aug. 23, 2012, Korean Patent Application No. 10-2012-0092532 filed Aug. 23, 2012, Korean Patent Application No. 10-2012-0092533 filed Aug. 23, 2012, and Korean Patent Application No. 10-2013-0089108 filed on Jul. 26, 2013, which are incorporated herein by reference in their entireties.

BACKGROUND OF THE INVENTION

1. Field of the Invention

The present invention relates to a hard coating film. More particularly, the present invention relates to a hard coating film with high fouling resistance, slip resistance, hardness and impact resistance.

This application claims the benefit of Korean Patent Application No. 10-2012-0092529, filed on Aug. 23, 2012, Korean Patent Application No. 10-2012-0092532, filed on Aug. 23, 2012, Korean Patent Application No. 10-2012-0092533, filed on Aug. 23, 2012, and Korean Patent Application No. 10-2013-0089108, filed on Jul. 26, 2013, which are all hereby incorporated by reference in their entireties into this application.

2. Description of the Related Art

With the advance of mobile appliances such as smart phones, tablet PCs and the like, substrates for displays have recently been required to become lighter and slimmer. Display windows or front panels of such mobile appliances are generally made of glass or reinforced glass both of which have excellent mechanical properties. However, glass suffers from the disadvantage of being heavy and being easily broken by an external impact.

As an alternative to glass, plastic resin films have emerged. Their light weight and resistance to impact are consistent with the trend of pursuing lighter and slimmer mobile appliances. Particularly, a film with high hardness and wear resistance is required. In this regard, it is proposed to utilize a structure in which the substrate is coated with a hard coating layer.

First of all, increasing the thickness of the hard coating layer is considered as an approach to improving the surface hardness thereof. In fact, the hard coating layer should be of a minimal thickness to ensure the surface hardness of the hard coating layer. As the hard coating layer increases in thickness, the surface hardness thereof may become higher. However, a thicker hard coating layer, although increasing the surface hardness, is more prone to setting shrinkage which leads to wrinkling or curling with the concomitant production of cracks or exfoliations, and thus thick hard coating layers are difficult to employ in practice.

Recently, some methods have been proposed for conferring a high hardness on hard coating films, without the problems of cracking and setting shrinkage-induced curling.

Korean Patent Application Publication No. 2010-0041992 discloses a hard coating film composition, free of monomers, comprising a binder resin based on ultraviolet-curable polyurethane acrylate oligomers. However, this hard coating film has a pencil hardness of about 3H, and thus the strength thereof is not sufficient to be a substitute for glass panels for displays.

SUMMARY OF THE INVENTION

Accordingly, the present invention has been made keeping in mind the above problems occurring in the prior art, and is to provide a hard coating film which retains fouling resistance and slip resistance while exhibiting high hardness and impact resistance.

In accordance with an aspect thereof, the present invention provides a hard coating film, comprising:

a supporting substrate;

a first hard coating layer, formed on one side of the supporting substrate, having a first surface energy; and a second hard coating layer, formed on another side of the supporting substrate, having a second surface energy, with a difference between the first and the second surface energies set to be 3 mN/m or greater.

Characterized by high hardness, impact resistance, scratch resistance, and transparency, the hard coating film of the present invention can be usefully applied to touch panels of mobile terminals, smart phones or tablet PCs, and as a cover or device panel for various displays, in substitution for glass.

DESCRIPTION OF THE PREFERRED EMBODIMENTS

The present invention addresses a hard coating film, comprising:

a supporting substrate;

a first hard coating layer, formed on one side of the supporting substrate, having a first surface energy; and a second hard coating layer, formed on another side of the supporting substrate, having a second surface energy, with a difference between the first and the second surface energies set to be 3 mN/m or greater.

All of the terms used in the specification are taken only to illustrate embodiments, and are not intended to limit the present invention. As used herein and in the appended claims, the singular forms "a", "an", and "the" include plural reference unless the context clearly dictates otherwise.

Additionally, the word "on" or "above," as used in the context of formation or construction of one element, means pertaining to the direct formation or construction of one element on another element directly or the additional formation or construction of one element between layers or on a subject or substrate.

The above detailed descriptions of embodiments of the invention are not intended to be exhaustive or to limit the invention to the precise form disclosed above. While specific embodiments of, and examples for the invention are described above for illustrative purposes, various equivalent modifications are possible within the scope of the invention, as those skilled in the relevant art will recognize.

These and other non-limiting characteristics of the disclosure are more particularly disclosed below.

In accordance with an aspect thereof, the present invention provides a hard coating film, comprising: a supporting substrate; a first hard coating layer, formed on one side of the supporting substrate, having a first surface energy; and a second hard coating layer, formed on another side of the supporting substrate, having a second surface energy, with a difference between the first and the second surface energies set to be 3 mN/m or greater.

The hard coating film of the present invention comprises a first and a second hard coating layer formed, respectively, on opposite sides of a supporting substrate.

Structured to sandwich a supporting substrate between two hard coating layers one of which is provided with a low surface energy to give fouling resistance and slip resistance thereto, with the other provided with a relatively high surface energy to have adhesiveness with a lower layer, the hard coating film of the present invention exhibits fouling resistance and high adhesiveness to another substrate, simultaneously.

In the hard coating film of the present invention, the first and the second hard coating layer have respective first and second side energies which differ from each other by 3 mN/m or greater.

Throughout the specification and in the appended claims, the term "surface energy" means a value calculated according to Young's equation from static contact angle measurements with water and diiodomethane drops on a surface, obtained by the Sessile drop technique using DSA100 of Kruss. In this context, the static contact angle is the angle that a liquid drop creates with a solid surface where a liquid/gas interface meets the solid surface.

As described above, the hard coating film of the present invention comprises a supporting substrate sandwiched between two hard coating layers which have respective surface energies, with a difference between the surface energies set to be 3 mM/m or greater. The first hard coating layer with a larger surface energy is adhesive to other substrates while the second coating layer with a smaller surface energy is resistant to fouling and slip. The hard coating film of this structure is disposed in such a way that the second hard coating layer with a smaller surface energy is directed toward the outside while the first hard coating layer with a larger surface energy faces a separate subject whereby the hard coating film can be protected from external fouling while sufficiently adhering to the subject.

Glass or reinforced glass, conventionally used as a window for displays of mobile divices and the like, is vulnerable to external contaminants, so that it requires an additional protective film for resistance against fouling and fingerprinting. On the other hand, plastic resin films or cured resin layers are insufficient in hardness. Also, they may be provided with an additional fouling- or fingerprint-resistant layer which, however, complexes the production process and increases the production cost.

In contrast, the hard coating film of the present invention exhibits hardness sufficient to be a substitute for glass, and is resistant to fouling without provision with an additional functional layer, thus being advantageous over conventional glass or plastic resin films. In addition, the hard coating film composed of a supporting substrate sandwiched between two hard coating layers different in surface energy from each other is disposed in such a way that one hard coating layer with a smaller surface energy is directed toward the outside while the other coating layer with a larger surface energy faces a separate subject whereby the hard coating film can be protected from external fouling while sufficiently adhering to the subject.

Further, the first hard coating layer with a larger surface energy is imparted with impact resistance and bending resistance while the second hard coating layer with a smaller surface energy is provided with high physical strength such as high hardness. In addition to fouling resistance and adhesivenss, thus, the hard coating film of the present invention exhibits high physical strength and excellent processability.

In one embodiment of the present invention, the first surface energy may differ from the second surface energy by approximately 3 mN/m or more, for example, by approximately 3 to 30 mN/m, by approximately 3.5 to 25 mN/m, or by approximately 4 to 20 mN/m.

In one embodiment of the present invention, the first surface energy may be approximately 26 mN/m or more, for example, range from approximately 26 to 50 mN/m, approximately from 28 to 48 mN/m, or approximately from 30 to 45 mN/m, while the second surface energy may be approximately 23 mN/m or more, for example, range approximately from 1 to 23 mN/m, approximately from 3 to 20 mN/m, or approximately from 5 to 18 mN/m.

When the first and the second surface energy are within the range, with the difference therebetween set forth above, the hard coating film is endowed with fouling resistance and adhesiveness, without deteriorating other physical properties.

According to one embodiment of the present invention, a difference in water contact angle between the first and the second hard coating layer may be approximately 10 degrees or more, for example, on the order of approximately 10 to 90 degrees, or on the order of approximately 20 to 85 degrees, or on the order of approximately 35 to 65 degrees.

According to one embodiment of the present invention, the water contact angle of the first hard coating layer may be approximately 80 degrees or less, for example, range from approximately 60 to 80 degrees, from approximately 66 to 76 degrees, or from approximately 63 to 73 degrees, while the water contact angle of the second hard coating layer may be as high as or higher than approximately 90 degrees, for example, range from approximately from approximately 90 to 170, from approximately 100 to 150 degrees, or from approximately 110 to 130 degrees.

To meet the condition for the second surface energy, the second hard coating layer has a fluorine (F) content of approximately 12 mol % or more, for example, range from approximately 12 to 30 mol %, based on the total element content thereof, as measured on the side or at a depth of 1 mm from the surface by XPS. Given the fluorine content set forth above, the second hard coating layer may have a surface energy of 23 mN/m or less.

Particularly, the second hard coating layer may be formed by properly modifying a coating process and/or a photocuring process so as to achieve a higher distribution of fluorine elements near the surface thereof. When fluorine elements are distributed near the surface of the second hard coating layer, the second hard coating layer may have a lower second surface energy.

As for the fluorine elements in the second hard coating layer, their origin may be fluorine compounds, such as fluoroacrylates or fluorine surfactants, but is not limited thereto. Examples of the fluoroacrylate include 1H,1H-perfluoro-n-octylacrylate, 1H,1H,5H-octafluoropentyl acrylate, 1H,1H,9H-hexadecafluorononyl acrylate, 2-(perfluorobutyl)ethyl acrylate, 2-(perfluorohexyl)ethyl acrylate, and 2-(perfluorodecyl)ethyl acrylate, but are not limited thereto. The fluorine surfactant is a surfactant having a perfluoroalkyl or perfluoroalkylene group, and may be exemplified by perfluoroalkyl sulfonic acid, perfluoroalkyl carboxylic acid, or salt thereof, but is not limited thereto. The fluoroacrylate or fluorine surfactant may be contained in a dispersed or crosslinked form in a photocurable crosslinking copolymer to be described later.

So long as it is transparent, any plastic resin, whether capable of being stretched or not, may be used for the supporting substrate on each side of which the first and the second hard coating layers are formed, without limitations imposed thereto. According to an embodiment of the present invention, the supporting substrate may include, for example, a polyester such as polyethyleneterephtalate (PET), a polyethylene such as ethylene vinyl acetate (EVA), cyclic olefin polymer (COP), cyclic olefin copolymer (COC), polyacrylate (PAC), polycarbonate (PC), polyethylene (PE), polymethylmethacrylate (PMMA), polyetheretherketon (PEEK), polyethylenenaphthalate (PEN), polyetherimide (PEI), polyimide (PI), triacetylcellulose (TAC), MMA (methyl methacrylate), or a fluoro-polymer. The supporting substrate may be a single layer structure, and, if necessary, may be a multilayer structure including two or more layers composed of the same or different materials, but is not particularly limited.

According to one embodiment of the present invention, the supporting substrate may be a multilayered substrate made of polyethyleneterephthalate (PET) or co-extruded polymethylmethacrylate (PMMA)/polycarbonate (PC).

According to another embodiment of the present invention, the supporting substrate may include a copolymer of polymethylmethacrylate (PMMA) and polycarbonate (PC).

The supporting substrate may range in thickness from 30 to 1,200 µm, or from 50 to 800 µm, but is not limited thereto.

Any component that meets the surface energy condition set forth above would be used in the first hard coating layer, without particular limitation. In one embodiment, the first hard coating layer may contain a photocurable crosslinking copolymer of tri- to hexa-functional acrylate monomers.

As used herein, the term "acrylate" is intended to encompass acrylate, methancrylate, and derivatives thereof with various substituents.

Examples of the tri- to hexa-function acrylate monomers include trimethylolpropane triacrylate (TMPTA), trimethylolpropaneethoxy triacrylate (TMPEOTA), glycerinpropoxylated triacrylate (GPTA), pentaerythritol tetraacrylate (PETA), dipentaerythritol hexaacrylate (DPHA), and the like. These tri- to hexa-functional acrylate monomers may be used alone or in combination.

In another embodiment of the present invention, the first hard coating layer may a photocurable crosslinking copolymer of mono- to bi-functional acrylate monomers in addition to the tri- to hex-functional acrylate monomers.

Examples of the mono- to bi-functional acrylate monomers include hydroxyethylacrylate (HEA), hydroxyethylmethacrylate (HEMA), hexanediodiacrylate (HDDA), and tripropylene glycol diacrylate (TPGDA), and ethylene glycol diacrylate (EGDA). The mono- to bi-functional acrylate monomers may be used, alone or in combination.

When the first hard coating layer contains a photocurable crosslinking copolymer of a mono- to bi-functional acrylate monomer in addition to a tri- to hexa-functional acrylate monomer, the weight ratio of the mono- to bi-functional acrylate monomer to the tri- to hexa-function acrylate monomer is not particularly limited, but may be on the order of about 1:99 to about 50:50, or about 10:90 to about 50:50, or about 20:80 to about 40:60. Given the weight ratio set forth above, the mono- to bi-functional acrylate monomer and the tri- to hexa-functional acrylate monomer confer high hardness and flexibility on the first hard coating layer without deteriorating other physical properties such as curling, light resistance, etc.

According to one embodiment of the present invention, the first hard coating layer may comprise a photocurable crosslinking copolymer of a photocurable elastic polymer crosslink-polymerized with the tri- to hexa-functional acrylate monomer.

As used herein, the term "photocurable elastic polymer" refers to a polymer which is elastic and contains a functional group that undergoes UV light-triggered crosslink polymerization.

According to one embodiment of the present invention, the photocurable elastic polymer may have an elongation of approximately 15% or more, for example, approximately 15 to 200%, approximately 20 to 200%, or approximately 20 to 150%, as measured according to ASTM D638.

The photocurable elastic polymer is crosslink-polymerized with the tri- to hexa-functional acrylate monomer and then cured to form the first or the second hard coating layer, conferring high hardness, flexibility and impact resistance to the hard coating film.

According to another embodiment of the present invention, the photocurable elastic polymer may be a polymer or oligomer having a weight average molecular weight of about 1,000 to about 600,000 g/mol or about 10,000 to about 600,000 g/mol.

The photocurable elastic polymer may be at least one selected from the group consisting of polycaprolactone, a urethane acrylate polymer, and polyrotaxane.

Among the polymers used as the photocurable elastic polymer, polycaprolactone is formed by the ring-opening polymerization of caprolactone, and has excellent physical properties such as flexibility, impact resistance, durability and the like.

Retaining a urethane bond therein, a urethane acrylate polymer has excellent elasticity and durability.

A polyrotaxane is a polymer of rotaxane, a mechanically-interlocked molecular architecture consisting of a dumbbell-shaped molecule which is threaded through a cyclic moiety (macrocycle). The two components of a rotaxane are kinetically trapped since the ends of the dumbbell (stoppers) are larger than the internal diameter of the ring and prevent disassociation of the components since this would require significant distortion of the covalent bonds.

In one embodiment, the photocurable elastic polymer may include a rotaxane comprising a cyclic moiety (macrocycle) in which lactone compounds with a (meth)acrylate moiety conjugated to the end thereof and are bonded each other; a thread moiety held within the macrocycle; and stoppers provided at both ends of the thread moiety so as to prevent dissociation of the macrocycle.

No particular limitations are imposed on the macrocycle if it is large enough to surround the linear moiety. The macrocycle may include a functional group such as a hydroxide group, an amino group, a carboxyl group, a thiol group, an aldehyde group or the like, which can react with other polymers or compounds. Specific examples of the macrocycle may include α-cyclodextrin, β-cyclodextrin, Y-cyclodextrin and mixtures thereof.

Further, the thread may be used without limitation as long as it is generally linear in shape with a minimal predetermined weight or greater. Preferably, a polyalkylene compound or a polylactone compound may be used in the thread. Specifically, a polyoxyalkylene compound including an oxyalkylene repetitive unit of 1 to 8 carbon atoms or a polylactone compound including a lactone repetitive unit of 3 to 10 carbon atoms may be used in the thread.

Meanwhile, the stopper may be appropriately adjusted depending on the characteristics of the rotaxane compound to be prepared. For example, the stopper may be at least one selected from the group consisting of a dinitrophenyl group, a cyclodextrin group, an amantane group, a trilyl group, a fluorescein group and a pyrene group.

As the first hard coating layer containing a photocurable elastic polymer is formed by photocuring the photocurable elastic polymer additionally, it allows the hard coating film to have high hardness and flexibility, ensuring excellent resistance to external impact.

In one embodiment of the present invention, the first hard coating layer comprises inorganic microparticles dispersed in the photocurable crosslinking copolymer.

According to an embodiment of the present invention, the inorganic particles may be inorganic nanoparticles having a particle size of about 100 nm or less, about 10 to about 100 nm or about 10 to about 50 nm. For example, silica particles, aluminum oxide particles, titanium oxide particles or zinc oxide particles may be used as the inorganic particles.

The inorganic particles in the hard coating layer make an additional contribution to improving the hardness of the hard coating film.

When inorganic microparticles are further contained in the first hard coating layer, their content ratio to the photocurable crosslinking copolymer is not particularly limited. In one embodiment, the weight ratio of the photocurable crosslinking copolymer to the inorganic microparticles may be approximately 40:60 to 90:10, or approximately 50:50 to 80:20. Given the amounts of the photocurable copolymer and the inorganic microparticles within the ranges set forth above, the hard coating film can be formed with an improvement in hardness.

Meanwhile, the first hard coating layer may further include typical additives such as a surfactant, a yellowing inhibitor, a leveling agent, an antifouling agent and the like in addition to the above-mentioned photocurable crosslink copolymer. Here, the content of the additive is may be variously adjusted to the degree that the physical properties of the hard coating film are not degraded. Its content is not particularly limited, but preferably ranges from approximately 0.1 to 10 weight parts, based on 100 weight parts of the photocurable crosslinking copolymer.

According to an embodiment of the present invention, for example, the first hard coating layer may include a surfactant as an additive. The surfactant may be a silicon surfactant. In this context, the surfactant may be contained in a dispersed or crosslinked form in the photocurable crosslinking copolymer. Further, the first hard coating layer may include a yellowing inhibitor as an additive. The yellowing inhibitor may be a benzophenone compound or a benzotriazole compound.

To satisfy a condition for the first surface energy, the first hard coating layer may not contain a fluorine compound at all or may contain a fluorine compound only in a trace amount. Hence, the first hard coating layer has a fluorine (F) content of approximately 12 mol % or less, 10 mol % or less, or 5 mol % or less, based on the total element content thereof, as measured on the surface of the first hard coating layer or at a depth of 1 mm from the surface of the first hard coating layer by XPS.

According to an embodiment of the present invention, the first hard coating layer may be provided with a functional group such as hydroxy (—OH) or carboxy (—COOH) by surface treatment with plasma, corona discharge, or an alkaline solution sodium hydroxide or potassium hydroxide. The surface treatment increases the surface energy of the first hard coating layer.

However, the absence or the presence in a trace amount of fluorine compounds, or surface treatment is suggested as an illustrative, non-limiting means to satisfy the condition for the first surface energy, and it should be understood that means other than the suggested falls within the scope of the present invention if it allows for the first surface energy.

In one embodiment, the first hard coating layer may have a thickness of 50 μm or more, for example, approximately 50 to 300 μm, approximately 50 to 200 μm, approximately 50 to 150 μm, or approximately 70 to 150 μm.

The first hard coating layer may be formed by photocuring a first hard coating composition comprising a first binder monomer, and a photoinitiator, and optionally inorganic microparticles, an organic solvent, and an additive after application to the substrate.

The first binder monomer may comprise a tri- to hexafunctional acrylate monomer. In one embodiment, the first binder monomer may comprise a mono- to bi-functional acrylate monomer in addition to the tri- to hexa-functional acrylate monomer. In another embodiment, the first binder monomer may comprise a photocurable elastic polymer in addition to the tri- to hexa-functional acrylate monomer.

Examples of the photoinitiator may include, but are not limited to, 1-hydroxy-cyclohexyl-phenyl ketone, 2-hydroxy-2-methyl-1-phenyl-1-propanone, 2-hydroxy-1-[4-(2-hydroxyethoxyl)phenyl]-2-methyl-1-propanone, methylbenzoylformate, α,α-dimethoxy-α-phenylacetophenone, 2-benzoyl-2-(dimethylamino)-1-[4-(4-morpholinyl)phenyl]-1-butanone, 2-methyl-1-[4-(methylthio)phenyl]-2-(4-morpholinyl)-1-propanone, diphenyl(2,4,6-trimethylbenzoyl)-phosphine oxide, and bis(2,4,6-trimethylbenzoyl)-phenylphophine oxide. Further, the photoinitiator may be commercially available, such as those sold under brand name, Irgacure 184, Irgacure 500, Irgacure 651, Irgacure 369, Irgacure 907, Darocur 1173, Darocur MBF, Irgacure 819, Darocur TPO, Irgacure 907, and Esacure KIP 100F. These photoinitiators may be used alone or in combination.

In the hard coating film of the present invention, the first hard coating composition may be used in a solvent free manner, or may comprise an organic solvent. In the latter case, it is advantageous to adjust the viscosity and fluidity of the composition and to increase the coatability of the composition.

Examples of the organic solvent available for the present invention include: alcohols such as methanol, ethanol, isopropyl alcohol, butanol and the like; alkoxy alcohols such as 2-methoxy ethanol, 2-ethoxy ethanol, 1-methoxy-2-propanol and the like; ketones such as acetone, methyl ethyl ketone, methyl isobutyl ketone, methyl propyl ketone, cyclohexanone and the like; ethers such as propyleneglycol monopropyl ether, propyleneglycol monomethyl ether, ethyleneglycolmonoethyl ether, ethyleneglycol monopropyl ether, ethyleneglycol monobutyl ether, diethyleneglycol monomethyl ether, diethyleneglycol monoethyl ether, diethyleneglycol monopropyl ether, diethyleneglycol monobutyl ether, diethyleneglycol-2-ethylhexyl ether and the like; and aromatic solvents such as benzene, toluene, xylene and the like. These organic solvents may be used, alone or in combination.

In the first hard coating composition comprising an organic solvent, the solid fraction may be used at a weight ratio of about 70:30 to about 99:1 with regard to the solvent. As such, when the first hard coating composition has a high solid content, the hard coating composition increases in viscosity, and thus can allow for a thick coating, for example, form the first hard coating layers at a thickness of 50 μm or more.

Any viscosity is given to the hard coating composition if it ensures the hard coating composition proper fluidity and coatability. However, a high solid content leads to a high viscosity. For example, the first hard coating composition of the present invention may range in viscosity from approximately 100 to 1,200 cps, from approximately 150 to 1,200 cps, or from approximately 300 to 1,200 cps at 25° C.

In order to enhance wetting between the supporting substrate and the first hard coating layer, treatment with plasma, corona discharge, or an alkaline solution such as sodium hydroxide or potassium hydroxide may be performed on the surface of the supporting substrate where the first hard coating layer will be applied, in advance of the application.

Any component that meets the second surface energy condition set forth above would be used in the second hard coating layer, without particular limitations. In one embodiment, the second hard coating layer may contain a photocurable crosslinking copolymer of tri- to hexa-functional acrylate monomers, which may be the same as or different from those used in the first hard coating layer.

According to one embodiment of the present invention, the second hard coating layer may comprise a photocurable crossing copolymer of mono- to bi-functional acrylate monomers polymerized with tri- to hexa-functional acrylate monomers.

According to one embodiment of the present invention, the second hard coating layer may comprise a photocurable crossing copolymer of a photocurable elastic polymer polymerized with tri- to hexa-functional acrylate monomers.

For details of the tri- to hexa-functional acrylate monomers, the mono- to bi-functional acrylate monomers, the photocurable elastic polymer, and the additives in the second hard coating layer, reference may be made to the description of the first hard coating layer. They may be the same as or different from those containing in the first hard coating layer.

In one embodiment of the present invention, the second hard coating layer comprises inorganic microparticles dispersed in the photocurable crosslinking copolymer.

According to an embodiment of the present invention, the inorganic particles may be inorganic nanoparticles having a particle size of about 100 nm or less, about 10 to about 100 nm or about 10 to about 50 nm. For example, silica particles, aluminum oxide particles, titanium oxide particles or zinc oxide particles may be used as the inorganic particles.

The inorganic particles in the hard coating layer make an additional contribution to improving the hardness of the hard coating film.

When inorganic microparticles are further contained in the second hard coating layer, their content ratio to the photocurable crosslinking copolymer is not particularly limited. In one embodiment, the weight ratio of the photocurable crosslinking copolymer to the inorganic microparticles may be approximately 40:60 to 90:10, or approximately 50:50 to 80:20. Given the amounts of the photocurable copolymer and the inorganic microparticles within the ranges set forth above, the hard coating film can be formed with an improvement in hardness.

Meanwhile, the second hard coating layer may further include typical additives such as a surfactant, a yellowing inhibitor, a leveling agent, an antifouling agent and the like in addition to the above-mentioned photocurable crosslinking copolymer and inorganic microparticles.

In one embodiment of the present invention, the second hard coating layer may contain a fluorine compound such as fluoroacrylate or a fluorine surfactant. Examples of the fluoroacrylate include 1H,1H-perfluoro-n-octylacrylate, 1H,1H,5H-octafluoropentyl acrylate, 1H, 1H, 9H-hexadecafluorononyl acrylate, 2-(perfluorobutyl)ethyl acrylate, 2-(perfluorohexyl)ethyl acrylate, and 2-(perfluorodecyl)ethyl acrylate. The fluorine surfactant is a surfactant having a perfluoroalkyl or perfluoroalkylene group, and may be exemplified by perfluoroalkyl sulfonic acid, perfluoroalkyl carboxylic acid, or salt thereof, but is not limited thereto.

Based on 100 weight parts thereof, the second hard coating layer may contain the fluorine compound in an amount of approximately 0.05 to 5 weight parts. When the content of the fluorine compound is within the range, the second hard coating layer can have a surface energy of 23 mN/m or less without a decrease in physical properties.

In one embodiment, the second hard coating layer may have a thickness of 50 μm or more, for example, approximately 50 to 300 μm, approximately 50 to 200 μm, approximately 50 to 150 μm, or approximately 70 to 150 μm.

The second hard coating layer may be formed by photocuring a first hard coating composition comprising a second binder monomer, a photoinitiator and a fluorine compound, and optionally an organic solvent, inorganic microparticles and an additive after application to the substrate.

The second binder monomer may comprise a tri- to hexa-functional acrylate monomer. In one embodiment, the second binder monomer may comprise a mono- to bi-functional acrylate monomer in addition to the tri- to hexa-functional acrylate monomer. In another embodiment, the second binder monomer may comprise a photocurable elastic polymer in addition to the tri- to hexa-functional acrylate monomer.

The photoinitiator used in the second hard coating composition may be the same as or different from that used in the first hard coating composition. For details of the photoinitiator, reference may be made to the description of the first hard coating composition. The photoinitiators may be used, alone or in combination.

Also, the organic solvent used in the second hard coating composition may be the same as or different from that used in the first hard coating composition. For details of the organic solvent, reference may be made to the description of the first hard coating composition.

In the second hard coating composition comprising an organic solvent, the solid fraction may be used at a weight ratio of about 70:30 to about 99:1 with regard to the solvent. As such, when the first hard coating composition has a high solid content, the hard coating composition increases in viscosity, and thus can allow for a thick coating, for example, form the second hard coating layers at a thickness of 50 μm or more.

Any viscosity is given to the hard coating composition if it ensures the second hard coating composition proper fluidity and coatability. However, a high solid content leads to a high viscosity. For example, the second hard coating composition of the present invention may range in viscosity from approximately 100 to 1,200 cps, from approximately 150 to 1,200 cps, or from approximately 300 to 1,200 cps at 25° C.

In accordance with one embodiment, the hard coating film of the present invention may further comprise at least one layer, or film, such as a plastic resin film, an adhesive film, an releasable film, an electrically conductive film, an electrically conductive layer, a curable resin layer, a non-conductive film, a metal mesh layer, or patterned metal layer, on the first hard coating layer. In addition, the layer, or film may take any form such as a monolayer, a bilayer or a lamination. The layer, or film may be constructed on the first hard coating layer by, but not limited to, laminating a freestanding film with the aid of an adhesive or an adhesive film, or by coating, deposition, or sputtering.

Particularly, the layer, or film may be brought into direct contact with the first hard coating layer to allow the hard coating film to improve in resistance against external impact and abrasion.

Since the first hard coating layer has a high surface energy, the hard coating film of the present invention is significantly adhesive to another layer, or film.

The first and the second hard coating compositions may be applied onto the front and back sides of the supporting substrate, respectively, in a sequential or simultaneous manner before photocuring.

The hard coating film according to the present invention may be prepared in the following manner.

First, the second hard coating composition containing the above-mentioned components is applied to one side of the supporting substrate and photocured to form a second hard coating layer.

Any method that is available in the art would be used in the application of the first hard coating composition without particular limitations. For example, the hard coating composition may be applied by bar coating, knife coating, roll coating, blade coating, die coating, micro-gravure coating, comma coating, slot die coating, lip coating, solution casting or the like.

Next, the applied second hard coating composition is photocured under UV light to form a second hard coating layer.

UV radiation may be emitted at a dose of approximately 20 to 600 $mJ/cm^2$, or approximately 50 to 500 $mJ/cm^2$. Any light source that is used in the art would be applied to the present invention without particular limitation. For example, a high-pressure mercury lamp, a metal halide lamp, a black light fluorescent lamp or the like may be used. The photocuring may be carried out by irradiating UV light at the dose for about 30 sec to about 15 min, or for about 1 to about 10 min.

After being completely cured, the first hard coating layer may have a thickness of approximately 50 to 300 μm, approximately 50 to 200 μm, approximately 50 to 150 μm, or approximately 70 to 150 μm.

The presence of the second hard coating layer ensures the high hardness of the hard coating film without a decrease in curling property.

Subsequently, the first hard coating composition comprising the above-mentioned components is applied to the other side, e.g., back side of the supporting substrate. Then, the first hard coating composition is cured to form a first hard coating layer after exposure to UV light. During the photocuring of the first hard coating composition, UV light is irradiated to an opposite side to that coated with the second hard coating composition. Thus, the curl which may be generated by setting shrinkage in the former photocuring step is counterbalanced to afford a flat hard coating film. No additional flattering processes are thus needed.

UV radiation may be emitted at a dose of approximately 20 to 600 $mJ/cm^2$, or approximately 50 to 500 $mJ/cm^2$. Any light source that is used in the art would be applied to the present invention without particular limitation. For example, a high-pressure mercury lamp, a metal halide lamp, a black light fluorescent lamp or the like may be used. The photocuring may be carried out by irradiating UV light at the dose for about 30 sec to about 15 min, or for about 1 to about 10 min.

Particularly, according to an embodiment of the present invention, the second hard coating layer may be formed by properly modifying a coating process and/or a photocuring process so as to achieve a higher distribution of fluorine elements near the surface of the second hard coating layer, which leads to a lower second surface energy. For example, when the second hard coating layer and the first hard coating layer are sequentially applied and photocured, as mentioned above, to prevent the setting shrinkage-caused curling, sufficient contact with air during the photocuring can induce the fluorine elements to rush to the surface of the second hard coating layer. A higher distribution of fluorine elements near the surface in the second hard coating layer results in a lower surface energy in the layer.

After being completely cured, the first hard coating layer may have a thickness of approximately 50 to 300 μm, approximately 50 to 200 μm, approximately 50 to 150 μm, or approximately 70 to 150 μm.

In the preparation method of the hard coating film according to one embodiment, coating and photocuring steps of the first hard coating composition may be performed in advance of or following those of the second hard coating composition.

For use as a cover for mobile terminals or tablet PCs, the hard coating film must have hardness or impact resistance elevated sufficiently to be a substitute for glass. Even when formed at a high thickness on the substrate, the hard coating layer of the present invention is less prone to curling or cracking, and imparts the hard coating film with high transparency and impact resistance.

The hard coating film according to the present invention is superior in fouling resistance, hardness, scratch resistance, transparency, durability, light resistance, and light transmittance.

The impact resistance of the hard coating film is high enough to be a substitute for glass. For example, the hard coating film of the present invention may not crack even after a steel bead weighing 22 g is freely dropped ten times from a height of 50 cm thereto.

In addition, the second hard coating layer in the hard coating film of the present invention may have a pencil hardness of 7H or more, 8H or more, or 9H or more at a load of 1 kg.

Further, after the second hard coating layer in the hard coating film of the present invention is tested by reciprocating 400 times with a steel wool #0000 under a load of 500 g on a friction tester, only two or less scratch may appear.

The hard coating film of the present invention may have a light transmittance of 91.0% or more, or 92.0% or more, and a haze of 1.0% or less, 0.5% or less, or 0.4% or less.

Further, the hard coating film of the present invention may have an initial color b value of 1.0 or less. After the hard coating film is exposed to UV-B under an ultraviolet lamp for 72 hrs or more, it may have a color b* value which differs from the pre-exposed color b* value by 0.5 or less, or by 0.4 or less.

When the hard coating film of the present invention is disposed on a plane after exposure to a temperature of 50° C. or higher at a humidity of 80% or higher for 70 hrs, the maximum distance at which each edge or side of the hard coating film is spaced apart from the plane may be about 1.0 mm or less, about 0.6 mm or less, or about 0.3 mm or less. More particularly, when the hard coating film of the present invention is disposed on a plane after exposure to a temperature of 50 to 90° C. at a humidity of 80 to 90% for 70 to 100 hrs, each edge or side of the hard coating film is spaced apart from the plane by about 1.0 mm or less, about 0.6 mm or less, or about 0.3 mm or less, maximally.

Exhibiting excellent physical properties including hardness, impact resistance, scratch resistance, transparency, durability, light resistance, and light transmittance, the hard coating film of the present invention has useful applications in various fields. For example, the hard coating film of the present invention can be used in the touch panels of mobile terminals, smart phones or tablet PCs, and as covers or device panels for various displays A better understanding of the present invention may be obtained through the following examples which are set forth to illustrate, but are not to be construed as limiting the present invention.

EXAMPLES

Preparation Example 1

Preparation of Photocurable Elastic Polymer

In a reactor, 50 g of a caprolactone-grafted polyrotaxane polymer [A1000, Advanced Soft Material INC] was mixed with 4.53 g of Karenz-AOI [2-acryloylethyl isocyanate, Showadenko Inc.], 20 mg of dibutyltin dilaurate [DBTDL, Merck], 110 mg of hydroquinone monomethylene ether, and 315 g of methyl ethyl ketone. Then, the mixture was reacted at 70° C. for 5 hrs to obtain polyrotaxane in which polylactone with an acrylate moiety conjugated to the end thereof acted as the macrocycle while cyclodextrin was positioned as the stopper.

The polyrotaxane had a weight average molecular weight of 600,000 g/mol, and was found to have an elongation of 20%, as measured according to ASTM D638.

Example 1

A first hard coating composition was prepared by mixing 6 g of trimethylolpropane triacrylate (TMPTA), 4 g of the polyrotaxane prepared in Preparation Example 1, 0.2 g of a photoinitiator (brand name: Darocur TPO), 0.1 g of a benzotriazole-based yellowing inhibitor (brand name: Tinuvin 400), and 1 g of methylethylketone.

A second hard coating composition was prepared by mixing 9 g of a silica-dipentaerythritolhexacrylate (DPHA) composite in which silica nanoparticles with a particle size of 20~30 nm were dispersed by 40 wt % (silica 3.6 g, DPHA 5.4 g), 1 g of the polyrotaxane of Preparation Example 1, 0.2 g of a photoinitiator (brand name: Darocur TPO), 0.1 g of a benzotriazole-based yellowing inhibitor (brand name: Tinuvin 400), and 0.05 g of a fluorine surfactant (brand name: FC4430).

The second hard coating composition was applied to a PET substrate 188 μm thick with a size of 15 cm×20 cm, and then subjected to first photocuring by exposure to 280-350 nm UV light from a black light fluorescence lamp.

Subsequently, the first hard coating composition was applied to the back side of the supporting substrate, and then exposed to 280-350 nm UV light from a black light fluorescence lamp to give a hard coating film. Each of the first and the second hard coating layers formed on both sides of the substrate was 100 μm thick.

Example 2

A hard coating film was prepared in the same manner as in Example 1, with the exception that 0.05 g of a fluorine acrylate (brand name: Optool DAC) was used instead of 0.05 g of the fluorine surfactant (brand name: FC4430).

Example 3

A first hard coating composition was prepared by mixing 6 g of trimethylolpropane triacrylate (TMPTA), 4 g of the polyrotaxane prepared in Preparation Example 1, 0.2 g of a photoinitiator (brand name: Darocur TPO), 0.1 g of a benzotriazole-based yellowing inhibitor (brand name: Tinuvin 400), 0.05 g of a fluorine surfactant (brand name: FC4430), and 1 g of methylethylketone.

A second hard coating composition was prepared by mixing 9 g of a silica-dipentaerythritolhexacrylate (DPHA) composite in which silica nanoparticles with a particle size of 20~30 nm were dispersed by 40 wt % (silica 3.6 g, DPHA 5.4 g), 1 g of the polyrotaxane of Preparation Example 1, 0.2 g of a photoinitiator (brand name: Darocur TPO), 0.1 g of a benzotriazole-based yellowing inhibitor (brand name: Tinuvin 400), and 0.05 g of a fluorine surfactant (brand name: FC4430).

The second hard coating composition was applied to a PET substrate 188 μm thick with a size of 15 cm×20 cm, and then subjected to first photocuring by exposure to 280-350 nm UV light from a black light fluorescence lamp.

Subsequently, the first hard coating composition was applied to the back side of the substrate, and then exposed to 280-350 nm UV light from a black light fluorescence lamp to give a hard coating film. Then, the surface of the cured first hard coating layer was immersed in a 10% KOH solution at 55° C. for 1 min, followed by drying at 60° C. for 2 min in an oven to afford a hard coating film. Each of the first and the second hard coating layers formed on both sides of the substrate was 100 μm thick.

Example 4

A hard coating film was prepared in the same manner as in Example 3, with the exception that the first hard coating composition did not contain 0.05 g of the fluorine surfactant (brand name: FC4430).

Example 5

A hard coating film was prepared in the same manner as in Example 1, with the exception that each of the first and the second hard coating layers formed on both sides of the substrate was 150 μm.

Example 6

A hard coating film was prepared in the same manner as in Example 3, with the exception that the first and the second hard coating layers were 125 μm and 100 μm thick, respectively.

Comparative Example 1

A hard coating film was prepared in the same manner as in Example 1, with the exception that the second hard coating composition did not contain the fluorine surfactant (brand name: FC4430).

Comparative Example 2

A first hard coating composition was prepared by mixing 6 g of trimethylolpropane triacrylate (TMPTA), 4 g of the polyrotaxane of Preparation Example 1, 0.2 g of a photoinitiator (brand name: Darocur TPO), and 0.1 g of a benzotriazole-based yellowing inhibitor (brand name: Tinuvin 400).

A second hard coating composition was prepared by mixing 9 g of a silica-dipentaerythritolhexacrylate (DPHA) composite in which silica nanoparticles with a particle size of 20~30 nm were dispersed by 40 wt % (silica 3.6 g, DPHA 5.4 g), 1 g of the polyrotaxane of Preparation Example 1, 0.2 g of a photoinitiator (brand name: Darocur TPO), and 0.1 g of a benzotriazole-based yellowing inhibitor (brand name: Tinuvin 400), and 0.05 g of a fluorine surfactant (brand name: FC4430).

The second hard coating composition was applied to a PET substrate 188 μm thick with a size of 15 cm×20 cm, and covered with a PET film to block contact with air. Subsequently, the first hard coating composition was applied to the back side of the substrate, and covered with a PET film to block contact with air, too.

Next, photocuring was performed by exposure to 280-350 nm UV light from a black light fluorescence lamp to form a first and a second hard coating layer, followed by removing the PET covers.

Each of the first and the second hard coating layers formed on both sides of the substrate was 100 μm thick.

Surface energies and fluorine contents of the hard coating films prepared in Examples 1 to 6 and Comparative Examples 1 and 2 are summarized in Table 1, below.

TABLE 1

|  | 1st Hard Coating Layer | | 2nd Hard Coating Layer | |
| --- | --- | --- | --- | --- |
|  | Surface energy (unit: mN/m) | F content (unit: mol %) | Surface energy (unit: mN/m) | F content (unit: mol %) |
| Ex. 1 | 43.4 | 0 | 19.1 | 21.6 |
| Ex. 2 | 43.4 | 0 | 21.0 | 17.5 |
| Ex. 3 | 32 | 11.2 | 19.1 | 21.6 |
| Ex. 4 | 47.5 | 0 | 19.1 | 21.6 |
| Ex. 5 | 43.4 | 0 | 19.1 | 21.6 |
| Ex. 6 | 32 | 11.2 | 19.1 | 21.6 |
| C. Ex. 1 | 43.4 | 0 | 41.2 | 0 |
| C. Ex. 2 | 44.2 | 0 | 43.8 | 0 |

Test Examples

<Measurement Method>

1) Fingerprint Resistance

An artificial fingerprint solution was applied to a rubber stamp which was then impressed on the surface of the second hard coating layer, followed by drying for 10 min. The imprint was removed with gauze and the remainder was evaluated with the naked eye. The artificial fingerprint was prepared according to JIS K 2246.

2) Scrawl Resistance

Two lines, each 5 cm long, were drawn on the surface of the second hard coating using an oil-based pen, and wiped with dust-free, ultrafine fiber cloth. The trace of the lines was examined with the naked eye. This procedure was repeated until the trace was detected, and the number of repetition of the procedure was recorded.

3) Adhesiveness

A column with dimensions of 1 mm×1 mm was drawn on the surface of the first hard coating layer. An adhesive tape (Nitto Tape No. 31) with a width of 25 mm was stuck on the surface with various loads, and then stripped off. A maximum load was measured at which the hard coating layer was not exfoliated, but remained intact.

4) Pencil Hardness

Pencil hardness was evaluated according to the Japanese Standard JIS K5400. In this regard, a pencil hardness meter was reciprocated three times on the second hard coating layer of each of the hard coating film under a load of 1.0 kg to determine the hardness at which no scratches were observed.

5) Scratch Resistance

After being loaded to a friction tester, a steel wool (#0000) was reciprocated 400 times on the second hard coating layer of each of the hard coating films under a load of 0.5 kg, and scratches thus formed were counted. Evaluation was made of the scratch resistance of the films by marking O for two or less scratches, Δ for two to less than five scratches, and x for five or more scratches.

6) Light Resistance

Differences in color b value of the hard coating films were measured before and after exposure to UVB from UV lamp for 72 hrs.

7) Transmittance and Haze

The hard coating films were measured for transmittance and haze using a spectrophotometer (brand name: CHO-400) 8) Curl property at high humidity and temperature After a hard coating film piece with dimensions of 10 cm×10 cm was stored for 72 hrs in a chamber maintained at a temperature of 85° C. and a humidity of 85%, it was placed on a flat plane. A maximal distance at which each edge of the piece was apart from the plane was measured.

9) Cylindrical Bending Test

Each of the hard coating films was wound on a cylindrical mandrel having a diameter of 1 cm so that the first hard coating is toward outside. When the hard coating film was not cracked, it was evaluated as OK. If the hard coating film was cracked, it was evaluated as X.

10) Impact Resistance

The impact resistance of each of the hard coating films was evaluated by determining whether or not each of the hard coating films was cracked when a 22 g steel ball was freely dropped 10 times on the second hard coating layer from a height of 50 cm. Each of the hard coating films was evaluated as OK when it was not cracked, and as X when cracked.

The results of the physical properties measured in each of the hard coating films are summarized in Table 2 below.

TABLE 2

|  | Ex. 1 | Ex. 2 | Ex. 3 | Ex. 4 | Ex. 5 | Ex. 6 | C. Ex. 1 | C. Ex. 2 |
| --- | --- | --- | --- | --- | --- | --- | --- | --- |
| Fingerprint Resistance | Good | Good | Good | Good | Good | Good | Poor | Poor |
| Scrawl Resistance | 100 rounds | 150 rounds | 100 rounds | 100 rounds | 100 rounds | 100 rounds | 1 round | 1 round |
| Adhesiveness | 1.35 kg | 1.35 kg | 1.05 kg | 1.45 kg | 1.35 kg | 1.05 kg | 1.46 kg | 1.40 kg |
| Pencil hardness | 8H | 8H | 8H | 8H | 8H | 8H | 8H | 8H |
| Scratch resistance | ○ | ○ | ○ | ○ | ○ | ○ | ○ | ○ |
| Light resistance | 0.20 | 0.21 | 0.20 | 0.19 | 0.20 | 0.20 | 0.20 | 0.22 |
| Transmittance | 92.3 | 92.1 | 92.1 | 92.2 | 92.3 | 92.1 | 92.4 | 92.0 |

TABLE 2-continued

|  | Ex. 1 | Ex. 2 | Ex. 3 | Ex. 4 | Ex. 5 | Ex. 6 | C. Ex. 1 | C. Ex. 2 |
|---|---|---|---|---|---|---|---|---|
| Haze | 0.3 | 0.3 | 0.3 | 0.3 | 0.3 | 0.3 | 0.2 | 0.2 |
| Bending test | OK | OK | OK | OK | OK | OK | OK | OK |
| Curl property at high humidity & temperature | 0.3 mm | 0.2 mm | 0.3 mm | 0.2 mm | 0.3 mm | 0.3 mm | 0.2 mm | 0.2 mm |
| Impact resistance | OK | OK | OK | OK | OK | OK | OK | OK |

As is understood from the data of Fig. 2, when the surface energy of the second hard coating layer was 23 mN/m or less, it exhibited excellent fouling resistance such as fingerprint resistance and scrawl resistance. In contrast, the second hard coating layers of Comparative Examples 1 and 2 had insufficient fouling resistance.

What is claimed is:

1. A hard coating film, comprising:
a supporting substrate;
a first hard coating layer, formed on one side of the supporting substrate, having a first surface energy; and
a second hard coating layer, formed on another side of the supporting substrate, having a second surface energy, with a difference between the first and the second surface energies set to be 3 mN/m or greater, and
wherein the hard coating film exhibits a pencil hardness of 7H or more at a load of 1 kg.

2. The hard coating film of claim 1, wherein the first surface energy is 26 mN/m or more and the second surface energy is 23 mN/m or less.

3. The hard coating film of claim 1, wherein the second hard coating layer has a fluorine (F) content of 12 mol % or more, based on the total element content thereof, as measured on a surface thereof or at a depth of 1 mm from the surface by XPS.

4. The hard coating film of claim 1, wherein the second hard coating layer contains a fluorine compound.

5. The hard coating film of claim 1, wherein the second hard coating layer has a fluorine (F) content of 12 mol % or less, based on the total element content thereof, as measured on a surface thereof or at a depth of 1 mm from the surface by XPS.

6. The hard coating film of claim 1, wherein the first hard coating layer is surface treated with plasma, corona discharge, or an alkaline solution.

7. The hard coating film of claim 1, wherein the first and the second hard coating layers are the same or different, and independently comprise a photocurable crosslinking copolymer of a tri- to hexa-functional acrylate monomer.

8. The hard coating film of claim 7, wherein the first and the second hard coating layer are the same or different, and independently comprise a photocurable crosslinking copolymer of a tri- to hexa-functional acrylate monomer and a mono- to bi-functional acrylate in addition to the tri- to hexa-functional acrylate monomer.

9. The hard coating film of claim 1, wherein the first and the second hard coating layer are the same or different, and independently comprise a photocurable crosslinking copolymer of a photocurable elastic polymer in addition to the tri- to hexa-functional acrylate monomer.

10. The hard coating film of claim 9, wherein the photocurable elastic polymer has an elongation of 15 to 200%, as measured according to ASTM D638.

11. The hard coating film of claim 9, wherein the photocurable elastic polymer is selected from the group consisting of a polycaprolactone, a urethane acrylate polymer, a polyrotaxane, and a combination thereof.

12. The hard coating film of claim 11, wherein the polyrotaxane comprises a cyclic moiety (macrocycle) in which lactone compounds with a (meth) acrylate moiety conjugated to the end thereof are bonded to each other; a thread moiety held within the macrocycle; and stoppers provided at both ends of the thread moiety so as to prevent dissociation of the macrocycle.

13. The hard coating film of claim 7, wherein the first and the second hard coating layers are the same or different, and independently further comprise inorganic microparticles dispersed in the photocurable crosslinking polymer.

14. The hard coating film of claim 1, wherein the first and the second hard coating layers are the same or different, and independently range in thickness from 50 to 300 μm.

15. The hard coating film of claim 7, wherein the tri- to hexa-functional acrylate monomer comprises at least one selected from the group consisting of trimethylolpropane triacrylate (TMPTA), trimethylolpropane ethoxytriacrylate (TMPEOTA), glycerin propoxylated triacrylate (GPTA), pentaerythritol tetraacrylate (PETA), and dipentaerythritol hexaacrylate (DPHA).

16. The hard coating film of claim 1, wherein the supporting substrate includes at least one selected from consisting of polyethyleneterephtalate (PET), ethylene vinyl acetate (EVA), a cyclic olefin polymer (COP), a cyclic olefin copolymer (COC), polyacrylate (PAC), polycarbonate (PC), polyethylene (PE), polymethylmethacrylate (PMMA), polyetheretherketon (PEEK), polyethylenenaphthalate (PEN), polyetherimide (PEI), polyimide (PI), triacetylcellulose (TAC), MMA (methyl methacrylate) and a fluoropolymer.

17. The hard coating film of claim 1, wherein the hard coating film does not crack when a 22 g steel ball is freely dropped 10 times thereon from a height of 50 cm.

18. The hard coating film of claim 1, two or less scratches are formed when the surface of the hard coating film is rubbed by reciprocating a steel wool #0000 thereon 400 times under a load of 500 g.

19. The hard coating film of claim 1, having a light transmittance of 91% or more, a haze of 0.4 or less, and a color b* value of 1.0 or less.

20. The hard coating film of claim 1, wherein the hard coating film has a color b* value after exposure to UV B for 72 hrs which differs from a pre-exposed, color b* value by 0.5 or less.

21. The hard coating film of claim 1, wherein when the hard coating film is disposed on a plane after exposure to a temperature of 50 ° C. or higher at a humidity of 80% or higher for 70 hrs or longer, film is spaced apart maximally.

22. The hard coating film of claim 1, further comprising on the first or the second hard coating layer at least one layer selected from the group consisting of a plastic resin film, an adhesive film, an releasable film, an electrically conductive film, an electrically conductive layer, a curable resin layer, a non-conductive film, a metal mesh layer, and a patterned metal layer.

* * * * *